T. W. Harvey,
Making Wood Screws,
Nº 4,700 — Patented Aug. 18, 1846.
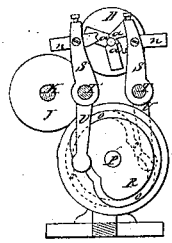
Fig. 4
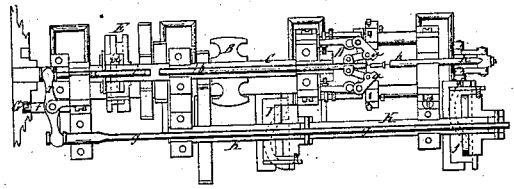
Fig. 3
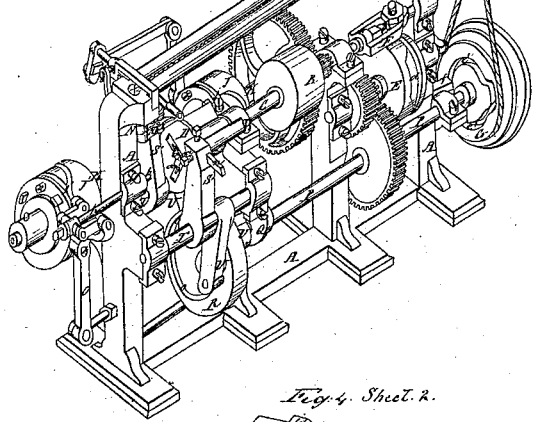
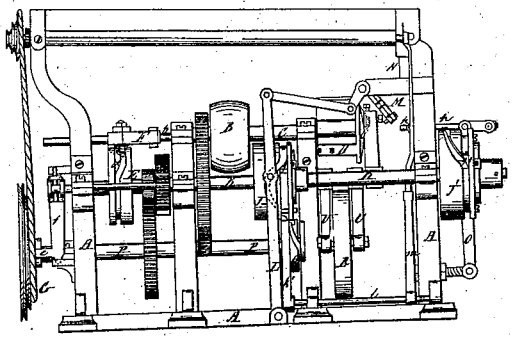
Fig. 2
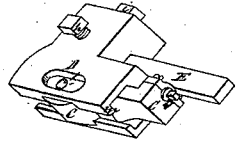
Fig. 4. Sheet 2.
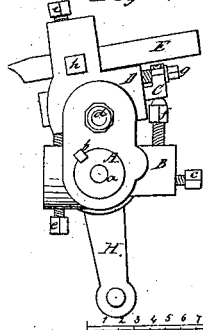
Fig. 1. Sheet 2.
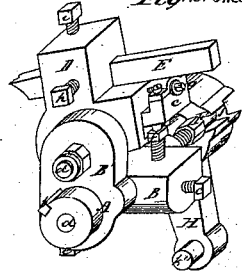
Fig. 2. Sheet 2.
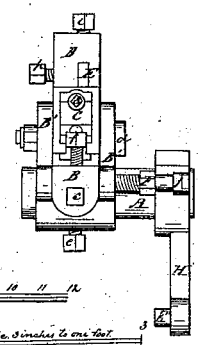
Fig. 3. Sheet 2.
N. PETERS, PHOTO-LITHOGRAPHER, WASHINGTON, D. C.

UNITED STATES PATENT OFFICE.

THOMAS W. HARVEY, OF NEW YORK, N. Y.

IMPROVEMENT IN MACHINERY FOR DRESSING SCREW-HEADS.

Specification forming part of Letters Patent No. 4,700, dated August 18, 1846.

*To all whom it may concern:*

Be it known that I, THOMAS W. HARVEY, of the city of New York, in the State of New York, have invented certain new and useful Improvements in the Manner of Constructing a Machine for Turning the Heads of Wood-Screws; and I do hereby declare that the following is a full and exact description thereof.

In the accompanying drawings, Figure 1 is a perspective view of the machine, taken from the front thereof. Fig. 2 is an elevation of the back of the machine; and Fig. 3, a horizontal section through certain parts of it, exhibiting the arrangement of the inner portion of the screw-holder and of the hollow shafts through which some of the operating parts of the machine are actuated, the same parts wherever they are represented being designated by the same letters of reference.

This machine, like the one for cutting the threads on wood-screws, which makes one of the series of four machines to be used consecutively for the attaining of one end—the manufacturing of wood-screws—is self-feeding, and the blanks which are to have their heads turned are to be placed in a hopper or between rollers operating as a hopper, whence they are to be passed one by one through a vertical conveyer, are to be received therefrom by feeding-fingers, and by them delivered so as to be held by gripping-dies in a suitable chuck while they are being turned. The manner of arranging the hopper, of giving motion to its rollers, and of separating one blank at a time so as to allow it to pass through the vertical conveyer, are the same in all particulars with those set forth in the specification of the apparatus for cutting the threads, and which are used also in that for cutting the nick in the heads of the blank. There is, however, considerable difference in the manner of arranging and operating the feeding-fingers and of the lever or rod which moves the slide to separate a single blank in the machine now under description in order to adapt them to the other parts thereof, and these differences will be presently pointed out.

A A is the frame of the machine.

B is the driving-pulley, placed on a hollow spindle C, which spindle carries the chuck D, that contains the gripping-dies $a\ a$, which are opened and closed in a manner similar to that used and fully described in the specification of the threading-machine. The blank, however, is delivered between the gripping-dies in a direction the reverse of that required in the threading-machine. The rod $b\ b$, Fig. 3, that passes through the hollow spindle C, is that which opens and closes the gripping-dies $a\ a$.

E is the grooved cylinder or cam that operates on the rod $b\ b$, as in the threading-machine.

F, Figs. 1 and 3, is the sliding swivel to which the rod $b\ b$ is attached, a guide-pin $c$, Figs. 1 and 2, from which enters a groove in the cam E, and thereby determines the opening and closing of the grippers. $d$ is a switch on said cam that is moved back and forth by the rod $i\ i$, attached to said switch, in a manner similar to that of the like cylindrical cam in the threading-machine, the grooved-faced cam G on the shaft P performing the office of what is denominated the "index-cam" in that apparatus, and this it does in the following manner: I, Fig. 3, is a vibrating lever that is rocked by the grooved cam G, a guide-pin $e$, Figs. 1, 2, and 3, on the arm $f$ descending from said lever and entering the groove $e'\ e'$, Fig. 1, in the cam, and as one end of the rod $i\ i$ is attached to said lever it moves it back and forth at the proper time. J J' are two grooved cylindrical cams on the hollow shaft K K, through which the rod $g\ g$ slides, the sliding being effected by the end of the lever I opposite to that which slides the rod $i\ i$. The rod $g\ g$ moves two switches $j$ and $j'$—one on each of the cylindrical cams J and J'—so as to cause said cams to vibrate the levers upon which they are to operate, or to allow them to remain at rest, as required. The cam J operates the feeding-fingers through the intermedium of the lever L, as shown most distinctly in Fig. 2. M are the feeding-fingers, which, when brought into a horizontal position, receive a blank from the vertical conveyer N, Figs. 1 and 2, and deliver it by the action of the lever L and its appendages, so as to be gripped by the gripping-dies, the fingers being brought into a vertical position for that purpose. They then return to the horizontal position to receive a fresh blank, and a punch or driver $h$ is advanced so as to force the blank in to a proper distance within the gripping-dies. The cam J' is that which operates the driver h, a guide-pin k on the lever O entering the groove in the cam for that purpose. The cam G is placed on the outer end of the shaft P P, and this shaft carries also the cams Q and R. The cam Q is the feeding-cam, which in its revolution moves an arm k', Fig. 2, attached to a rock-shaft l, and on the opposite end of this shaft is the feeding-lever m, that moves the slide, which allows a blank to fall through the conveyer N. The cam R on the shaft P is called the "cutter-cam," as it serves to govern the action of the turning-tools.

S' S', Fig. 1, are arms, one of which is a tool-holder and the other carries a rest, which tool and rest are to brought up on opposite sides of the blank the head of which is to be turned. The tool n in the arm S has a V-notch in it that is adapted to the turning of the face and bevel of the head. This tool is adjustable in the tool-holder, as is also a piece forming the rest, which piece bears against the opposite side of the blank. The arms S S' are affixed to rock-shafts T T', to which also are affixed the arms U U. These latter have guide-pins on them that enter grooves e e on each of the faces of the cutter-cam R, the grooves being so formed on the opposite sides of the cam as to advance and draw back the tool and rest simultaneously.

Fig. 4 is a vertical cross-section through a part of the machine, giving a direct face view of the cam R and a side view of the arms S S', and of one of the arms U on the shafts T T'. In this figure n' is the rest. The other parts are designated by their appropriate letters. The groove o on the reverse side of the cam R is represented by dotted lines.

In the gearing of this machine the shaft K is made to move five to one slower than the spindle C and five to one faster than the shaft P, making the last (P) twenty-five to one slower than the spindle. The cutting apparatus receives its motion in this machine from the cam G, which is placed on the slowest shaft P. The cutting-tool, which is governed by the cam R on this shaft, is kept in operation on the blank during four-fifths of the time of its revolution, and is withdrawn during one-fifth only, this allowing sufficient time for the feeding-fingers to move down and to supply a fresh blank to the chuck.

In the foregoing description I have presented the tool-holder and its immediate appendages which constitute the cutting apparatus in its most simple form; but I intend in general to use it in that which I am about to describe, and which I have named the "adjustable turning head," in which its respective parts are made susceptible of every necessary change of position—such, for example, as the raising of the cutting-point of the tool, of regulating its distance from the head of the blank, and of moving said adjustable head longitudinally with the machine, thereby adapting it more perfectly to screws of different lengths. This manner of arranging the adjustable head and tool-holder is shown in the sheet of drawings marked No. 2, in which sheet this part of the apparatus is drawn of the full size of an operating-machine.

A A, Figs. 1, 2, and 3, Sheet No. 2, is the rock-shaft on which the adjustable head is affixed, a similar rock-shaft being used for the rest, as above described. These rock-shafts may turn on adjusting-screws adapted to their centers a a in the ordinary manner. This shaft corresponds with that marked T in the first sheet of drawings.

B B, Figs. 1, 2, and 3, is the basis of the adjustable head. The cheek-pieces B' B', which extend above the part B, constitute a part of this basis and sustain the tool-holder proper. The part B B' is keyed or otherwise firmly attached to the shaft A, but it may be slid endwise on it. This part is held from turning round on said shaft by a feather b b, Figs. 1 and 2, and is fastened in place by the tempering-screws c c c. In setting this head on the shaft A, it may be regulated longitudinally on said shaft in the most perfect manner by the tempering-screw F, Figs. 2 and 3, which passes through the head of the arm H, which arm is firmly affixed to the shaft.

C C, Figs. 1 to 4, is a slide or seat-piece upon which the tool-holder D is placed and upon which it may be slid endwise. This seat-piece is connected to the cheek-pieces B' B' by a bolt d, on which it may be made to turn. It may be adjusted with precision and held in place by the tempering-screws e and f.

D D in each of the figures is the tool-holder proper, which is nicely fitted to and is made to slide upon the seat-piece C, the tempering-screws g g serving to adjust them to each other. To admit of their necessary adjustment there are slots made through the sides of the tool-holder, as shown at l, Fig. 4.

E is the cutting-tool, which is the same with that already described in this specification.

H, Figs. 1, 2, and 3, is the arm which vibrates the rock-shaft A by the aid of the guide-pin k'', which enters the groove in the cutter-cam, as already described.

What I claim as new in the within-described machine for turning the heads of wood-screws, is—

1. The particular manner in which I arrange, combine, and operate the punch or driver n, the tool-holder, and the rest, which are actuated by the double-grooved cutter-cam R, so as to co-operate in the turning of the heads of the blanks, in virtue of the arrangement of the moving parts herein fully set forth.

2. The particular manner herein described of constructing the adjustable turning head, the slides or seat-pieces C, the tool-holder D, sliding on the piece C between the cheek-pieces B', with the respective adjustments thereof, combined, arranged, and operating so as to effect the setting of the tool, substantially as herein set forth.

The manner of operating the gripping-dies and of separating the blanks in the hopper and conveying them to the feeding-fingers being similar to those described and used in the machine for cutting the threads, I do not herein claim in their individual capacity, such parts thereof as I deem new having been claimed by me in their combination with the threading-machine; but I do claim them in their combination with the apparatus for turning the heads, as herein described and made known.

THOS. W. HARVEY.

Witnesses:
A. H. HARVEY,
A. P. HAWLEY.